United States Patent
Cull et al.

(10) Patent No.: US 7,956,558 B2
(45) Date of Patent: Jun. 7, 2011

(54) AUTOMATIC TRACTION CONTROL FOR TWO SEPARATELY EXCITED MOTORS UTILIZING A SINGLE ELECTRONIC CONTROL

(75) Inventors: Ian Dirk Cull, Gloucester, MA (US); Christian Charles Elie Peyla, Essex, MA (US)

(73) Assignee: PG Trionic, Inc., Essex, MA (US)

( * ) Notice: Subject to any disclaimer, the term of this patent is extended or adjusted under 35 U.S.C. 154(b) by 407 days.

(21) Appl. No.: 12/327,002

(22) Filed: Dec. 3, 2008

(65) Prior Publication Data

US 2009/0139782 A1 Jun. 4, 2009

Related U.S. Application Data

(60) Provisional application No. 60/991,932, filed on Dec. 3, 2007.

(51) Int. Cl.
*H02P 5/00* (2006.01)

(52) U.S. Cl. ........... 318/49; 318/811; 318/599; 318/139

(58) Field of Classification Search .................. 318/139, 318/432, 49, 51, 53, 599, 811
See application file for complete search history.

(56) References Cited

U.S. PATENT DOCUMENTS

| | | | | |
|---|---|---|---|---|
| 4,616,166 | A | * | 10/1986 | Cooper et al. ................ 318/712 |
| 6,023,137 | A | * | 2/2000 | Kumar et al. ............ 318/400.27 |
| 6,064,173 | A | * | 5/2000 | Bock ............................. 318/716 |
| 7,329,960 | B1 | * | 2/2008 | Kumar ........................ 290/40 C |

* cited by examiner

*Primary Examiner* — Rina I Duda
(74) *Attorney, Agent, or Firm* — Price, Heneveld, Cooper, DeWitt & Litton, LLP

(57) ABSTRACT

An automatic traction control system is provided for an electric or hybrid-electric vehicle. The automatic traction control system may be used with vehicles using two separately excited motors where the armatures of the motors are connected in series to provide differential control. The automatic traction control system monitors and compares the voltages across the armatures of the two motors. If the voltage differential exceeds a predetermined threshold, it is determined that one of the wheels is spinning and current is diverted from the motor driving the spinning wheel to the motor driving the non-spinning wheel.

21 Claims, 3 Drawing Sheets

US 7,956,558 B2

AUTOMATIC TRACTION CONTROL FOR TWO SEPARATELY EXCITED MOTORS UTILIZING A SINGLE ELECTRONIC CONTROL

CROSS-REFERENCE TO RELATED APPLICATIONS

This application claims the benefit under 35 U.S.C. §119(e) of U.S. Provisional Application No. 60/991,932, filed on Dec. 3, 2007, the entire disclosure of which is hereby incorporated herein by reference.

BACKGROUND OF THE INVENTION

The present invention generally pertains to an electronic control system for controlling two electric motors, and more particularly pertains to an electronic control system for controlling two separately excited electric motors of a vehicle in such a manner as to provide automatic traction control.

The use of electric motors to propel vehicles has become increasingly more common. Electric motors have been used on trains for decades and are now used on electric and hybrid-electric automobiles and trucks. Unlike vehicles that solely rely on combustion engines, vehicles that use electric motors may employ an electric motor for each drive wheel. FIG. 1 shows an example of a control system for controlling two separately excited electric motors 12a and 12b used to drive two drive wheels on opposite sides of the vehicle. As shown, each motor 12a and 12b includes a respective armature 15a and 15b and field component 17a and 17b. Each motor 12a and 12b is part of a respective drive system 20a and 20b provided for the right and left wheels at the front or rear of the vehicle.

Each drive system 20a and 20b includes its own microprocessor 25a and 25b coupled to a respective power interface 30a and 30b. Each system 20a and 20b further includes a main power switch 35a and 35b coupled in series with respective armatures 15a and 15b, while having a control terminal coupled to power interface 30a and 30b, respectively. Main power switches 35a and 35b are used to control the speed of motors 12a and 12b in response to signals originating from microprocessor 25a and 25b.

Drive systems 20a and 20b each include a respective bypass switch 37a and 37b coupled across armatures 15a and 15b so as to selectively divert current from armatures 15a and 15b in response to control signals originating from microprocessors 25a and 25b. In addition, each drive system 20a and 20b includes a first low power switch 41a and 41b, a second low power switch 42a and 42b, a third low power switch 43a and 43b, and a fourth low power switch 44a and 44b. These low power switches are coupled to opposite ends of field components 17a and 17b and operate under control of microprocessors 25a and 25b to change the polarity of the power supplied to field components 17a and 17b so as to rotate the motors and hence the wheels forward or reverse.

The two drive systems 20a and 20b generally operate separately and the motors 12a and 12b are separately excited. A steering potentiometer 50 may be provided that is coupled to the vehicle's steering wheel so as to signal the microprocessors 25a and 25b that the vehicle is turning and to what extent. Microprocessors 25a and 25b also receive a signal representing the vehicle speed. Microprocessors 25a and 25b respond to these signals by independently and selectively varying the speed of the motors 12a and 12b using main power switches 35a and 35b. Thus, when a vehicle is turning, the microprocessor of the drive system driving the inside wheel causes its motor to operate at a lower speed, while the microprocessor of the drive system driving the outside wheel causes its motor to operate at a higher speed.

The system shown in FIG. 1 does not provide any form of traction control or differential lock. Another drawback to the system of FIG. 1 is that it utilizes two separate electronic control units, which together employ two microprocessors, four high power switches and eight low power switches.

Traction control utilizing a single electronic control unit has been available for many years concerning the control of two series-wound DC electric motor systems. An example of such a system is shown in FIG. 2.

FIG. 2 shows a drive system including a single electronic control unit and two motors with armatures 115a and 115b connected in parallel, effectively acting like an electronic differential, similar to the mechanical differential on a car. When one of the wheels spins, as detected via a speed sensor on each wheel, a microprocessor 125 changes the wiring of the armatures 115a and 115b of the two motors via a power interface 130 and two change-over contactor/relays 114a and 114b, to be connected in parallel, at which time equal power will be applied to the two wheels, allowing the wheel which is still on the ground (as opposed to the spinning wheel) to move the vehicle. As there is no means to know when the microprocessor 125 should change the connection of armatures 115a and 115b to go back to the differential mode, the program will allow the armatures 115a and 115b of the two motors to be connected back in series mode after a time delay. If one of the wheels is still spinning, then armature connection will be changed again, as noted above, to repeat the process again. This process will continue, i.e., the vehicle will stop and then start again until both wheels gain traction.

As further shown in FIG. 2, a main power switch 135 selectively completes the circuit of the vehicle batteries 151 and 152 and armatures 115a and 115b. The field components 117a and 117b of the two motors are also connected in series with the batteries and the armatures. The polarity of the field components may be switched via relay switches 141 and 142. A circuit breaker 155 may be coupled in series with armatures 115a and 115b. In addition, an operator interface 150 may be coupled to microprocessor 125 so as to provide vehicle speed and turning information.

Although the system shown in FIG. 2 provides a form of traction control, the two motors are not separately excited, which gives only limited control.

It has not previously been known to use ea single electronic control unit device which can bring about automatic traction control in two or more separately excited motor systems.

SUMMARY OF THE INVENTION

According to one aspect of the present invention, an automatic fraction control system is provided for a vehicle driven by first and second serially connected electric motors that are powered by batteries. The automatic fraction control system comprises an operator interface for generating an operator input signal representing a desired acceleration for the vehicle as applied to an accelerator pedal of the vehicle; a main electronic power switch coupled between the second electric motor and a negative terminal of the batteries for selectively varying current flowing through the first and second serially connected electric motors in response to a main power switch control signal; a first electronic power switch coupled across an armature of the first electric motor for selectively diverting current from the armature of the first electric motor in response to a first power switch control signal; a second electronic power switch coupled across an armature of the second electric motor for selectively diverting current from the armature of the second electric motor in response to a second power switch control signal; a first voltage monitor terminal coupled between the armatures of the first and second electric motors; a second voltage monitor terminal coupled between the armature of the second electric motor and the main electronic power switch; and a microprocessor coupled to the operator interface for receiving the operator input signal, the microprocessor monitors the voltage across the armatures of the first and second electric motors, and generates the switch control signals as a function of the operator input signal, the voltage across the armature of the first electric motor, and the voltage across the armature of the second electric motor.

According to another aspect of the present invention, an automatic fraction control system is provided for a vehicle driven by first and second serially connected electric motors that are powered by batteries. The automatic fraction control system comprises an operator interface for generating an operator input signal representing a desired acceleration for the vehicle as applied to an accelerator pedal of the vehicle; a main electronic power switch coupled between the second electric motor and a negative terminal of the batteries for selectively varying current flowing through the first and second serially connected electric motors in response to a main power switch control signal; a first electronic power switch coupled across an armature of the first electric motor for selectively diverting current from the armature of the first electric motor in response to a first power switch control signal; a second electronic power switch coupled across an armature of the second electric motor for selectively diverting current from the armature of the second electric motor in response to a second power switch control signal; a first current monitor for monitoring the current passing through the armature of the first electric motor; a second current monitor for monitoring the current passing through the armature of the second electric motor; and a microprocessor coupled to the operator interface for receiving the operator input signal, the microprocessor monitors the current flowing through each of the armatures of the first and second electric motors, and generates the switch control signals as a function of the operator input signal, the current flowing through the armature of the first electric motor, and the current flowing through the armature of the second electric motor.

According to another aspect of the present invention, a drive system is provided for an electric or hybrid-electric vehicle comprising an accelerator pedal; batteries having a positive terminal and a negative terminal; a first electric motor having an armature and a first field component; a second electric motor having an armature and a second field component, the armatures of the first and second electric motors being serially connected between the positive and negative terminal of the batteries; an operator interface for generating an operator input signal representing a desired acceleration for the vehicle as applied to the accelerator pedal; a main electronic power switch coupled between the second electric motor and the negative terminal of the batteries for selectively varying current flowing through the armatures of the first and second electric motors in response to a main power switch control signal; a first electronic power switch coupled across the armature of the first electric motor for selectively diverting current from the armature of the first electric motor in response to a first power switch control signal; a second electronic power switch coupled across the armature of the second electric motor for selectively diverting current from the armature of the second electric motor in response to a second power switch control signal; a first current monitor for monitoring the current passing through the armature of the first electric motor; a second current monitor for monitoring the current passing through the armature of the second electric motor; a first voltage monitor terminal coupled between the armatures of the first and second electric motors; a second voltage monitor terminal coupled between the armature of the second electric motor and the main electronic power switch; a power interface coupled to the main electronic power switch, the first electronic power switch, the second electronic power switch, the first current monitor, the second current monitor, the first voltage monitor terminal, and the second voltage monitor terminal; and a microprocessor coupled to the operator interface for receiving the operator input signal, and coupled to the power interface for monitoring the current flowing through each of the armatures of the first and second electric motors, the voltage across the armatures of the first and second electric motors, and for generating the switch control signals as a function of the operator input signal, the current flowing through the armature of the first electric motor, the current flowing through the armature of the second electric motor, the voltage across the armature of the first electric motor, and the voltage across the armature of the second electric motor.

These and other features, advantages, and objects of the present invention will be further understood and appreciated by those skilled in the art by reference to the following specification, claims, and appended drawings.

DETAILED DESCRIPTION OF THE PREFERRED EMBODIMENT

Figure 1:
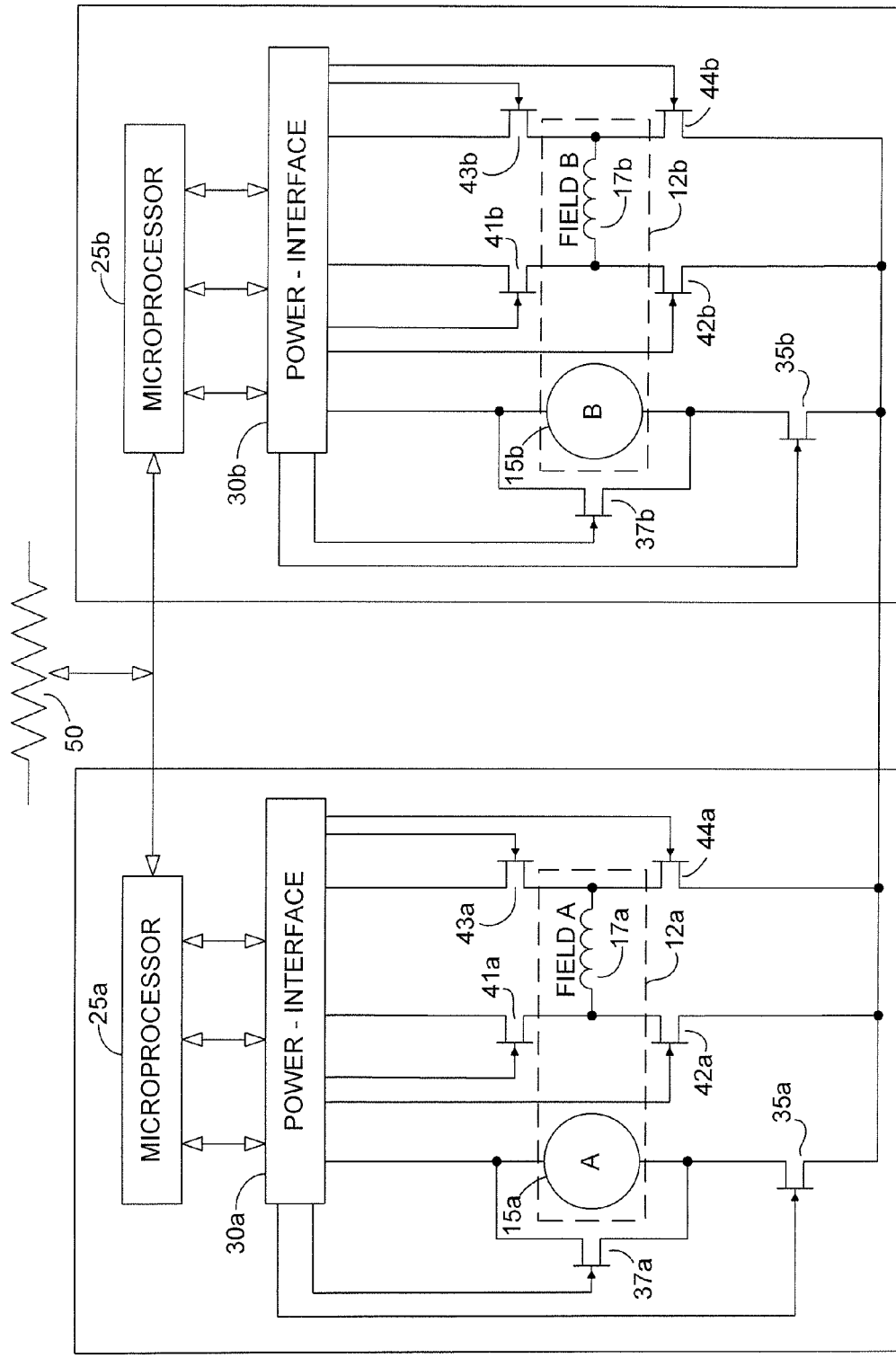
FIG. 1 is an electrical circuit diagram in block and schematic form of a prior art system for two separately excited motors.
Figure 2:
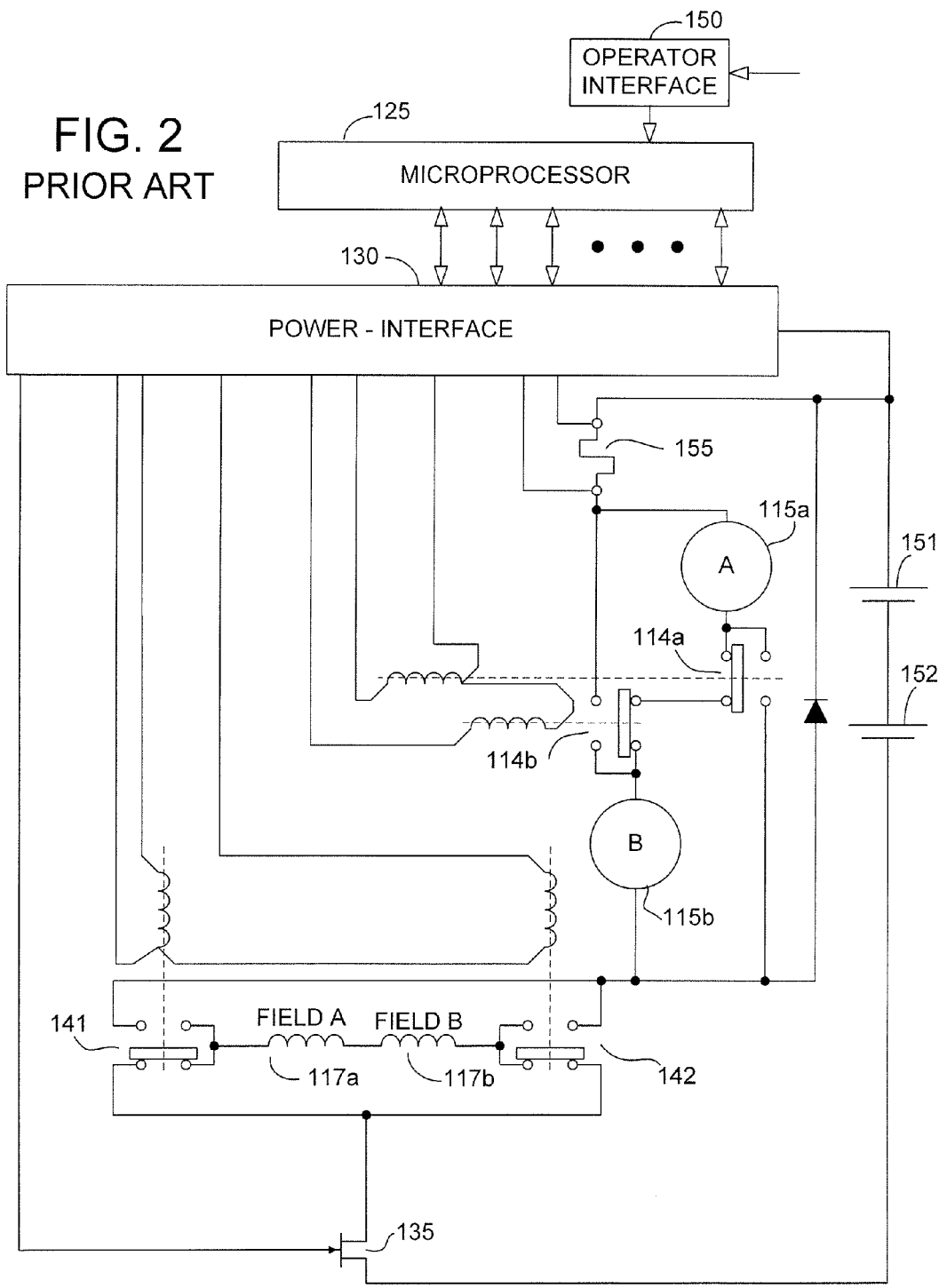
FIG. 2 is an electrical circuit diagram in block and schematic form of a prior art system for two motors with differential control.

According to one embodiment of the present invention, a single electronic control unit is provided that provides automatic traction control with two separately excited motors. This arrangement is inherently more cost effective and is a more reliable system than what has been customarily used in the industry, that is to say, the utilization of two electronic control units, one to control each separately excited motor system, and interfacing the two electronic control units with a potentiometer or other electronic device to communicate between the separate control units, bringing about effective traction control as shown in FIG. 1.

Figure 3:
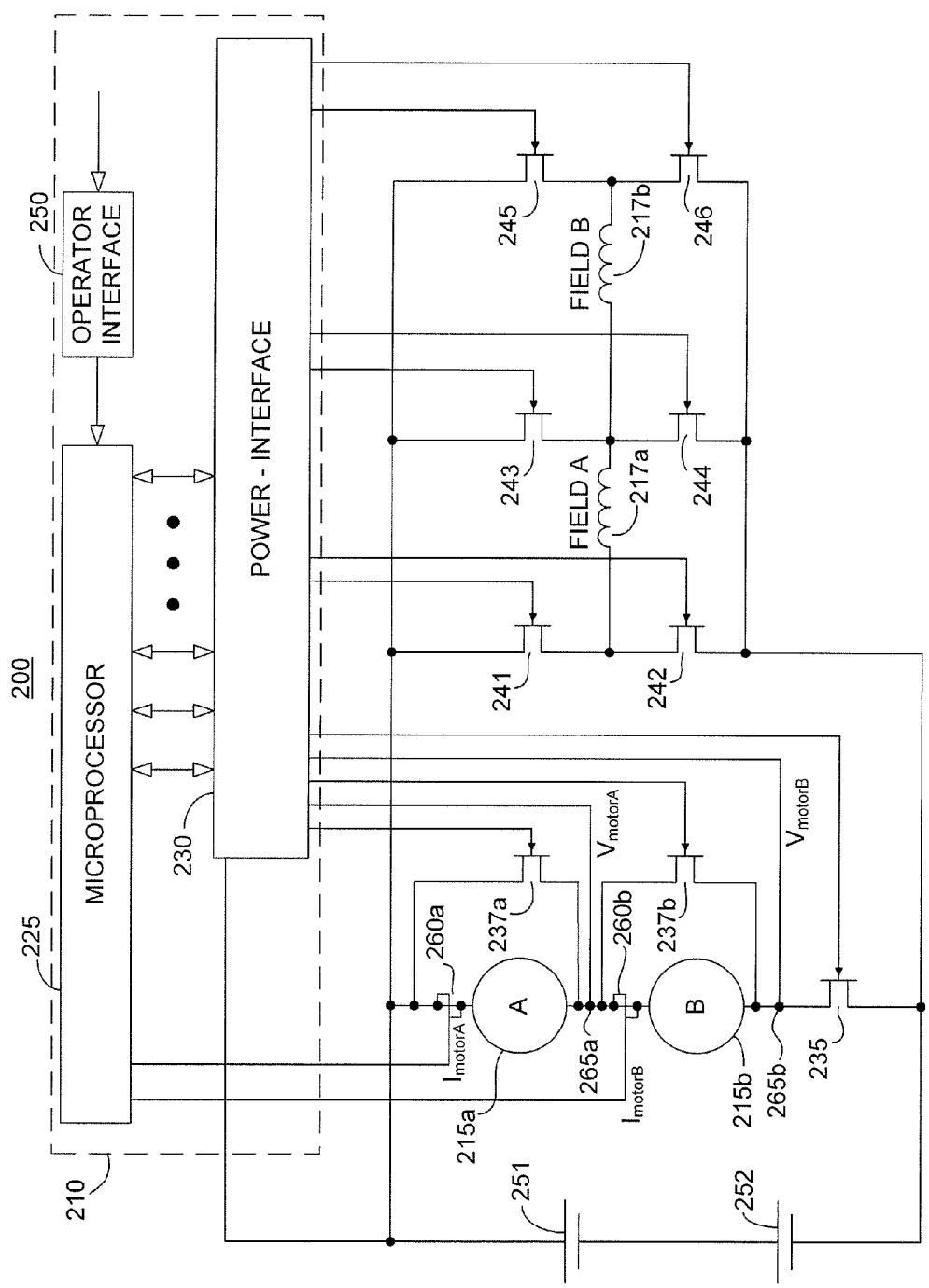
FIG. 3 is an electrical circuit diagram in block and schematic form of one embodiment of the present invention.

FIG. 3 shows a drive system 200 for an electric or hybrid-electric vehicle driven by first and second serially connected electric motors that are powered by batteries 251 and 252. The drive system includes an automatic traction control system that is described further below. The first electric motor includes a first armature 215a and a first field component 217a and the second electric motor includes a second armature 215b and a second field component 217b.

The automatic traction control system may include some or all of the following: an operator interface 250 for generating an operator input signal representing a desired acceleration for the vehicle as applied to an accelerator pedal of the vehicle and a desired extent of turning as read from a steering wheel of the vehicle; a main electronic power switch 235 coupled between armature 215b of the second electric motor and a negative terminal of battery 252 for selectively varying current flowing through armatures 215a and 215b of the first and second serially connected electric motors in response to a main power switch control signal; a first electronic power switch 237a coupled across armature 215a of the first electric motor for selectively diverting current from armature 215a of the first electric motor in response to a first power switch control signal; a second electronic power switch 237b coupled across armature 215b of the second electric motor for selectively diverting current from armature 215b of the second electric motor in response to a second power switch control signal; a first current monitor 260a for monitoring the current passing through armature 215a of the first electric motor; a second current monitor 260b for monitoring the current passing through armature 215b of the second electric motor; a first voltage monitor terminal 265a coupled between respective armatures 215a and 215b of the first and second electric motors; a second voltage monitor terminal 265b coupled between armature 215b of the second electric motor and main electronic power switch 235; a power interface 230 coupled to main electronic power switch 235, first electronic power switch 237a, second electronic power switch 237b, first current monitor 260a, second current monitor 260b, first voltage monitor terminal 265a, and second voltage monitor terminal 265b; and a microprocessor 225 coupled to operator interface 250 for receiving the operator input signal, and coupled to power interface 230 for monitoring the current flowing through each of armatures 215a and 215b of the first and second electric motors for monitoring the voltage across armatures 215a and 215b of the first and second electric motors, and for generating the switch control signals as a function of the operator input signal, the current flowing through armature 215a of the first electric motor, the current flowing through armature 215b of the second electric motor, the voltage across armature 215a of the first electric motor, and the voltage across armature 215b of the second electric motor.

Microprocessor 225, power interface 230, and operator interface 250 together constitute a single control unit 210, which controls the operation of the separately excited first and second motors. By connecting both armatures 215a and 215b of the separately excited motors in series, a differential mode is provided. The current $I_{motorA}$ and $I_{motorB}$ and the voltage $V_{motorA}$ and $V_{motorB}$ of each motor is monitored (by first and second current monitors 260a and 260b (illustrated as shunts) and by voltage monitor terminals 265a and 265b) and if a significant differential is detected, then one motor (wheel) is with little or no traction. Alternatively, a difference in wheel motor speed, and, thus a loss of traction, can also be determined by utilizing an electronic or mechanical speed detector at each wheel. Either switch 237a or 237b, depending upon the motor, short circuits the armature of the motor (wheel) with little or no traction and the other motor (wheel) works effectively and does not lose power from the motor with little or no traction. Microprocessor 225 thus generates the first power switch control signal to divert current from armature 215a of the first electric motor when the voltage monitored across armature 215b of the second electric motor exceeds the voltage monitored across armature 215a of the first electric motor by more than a predetermined voltage threshold and the current monitored by first and second current monitors 260a and 260b is lower than a predetermined current threshold. Similarly, microprocessor 225 generates the second power switch control signal to divert current from armature 215b of the second electric motor when the voltage monitored across armature 215a of the first electric motor exceeds the voltage monitored across armature 215b of the second electric motor by more than the predetermined voltage threshold and the current monitored by first and second current monitors 260a and 260b is lower than the predetermined current threshold. The voltage and current thresholds used depend upon the size of the vehicle. As an example, in a 48 volt, 15,000 lbs. off-road vehicle, a voltage threshold of 10 volts between the two motors associated with a current lower than 10 amperes will be used to activate one of switches 237a and 237b to short circuit the spinning motor (wheel), thereby providing torque to the other non-spinning motor (wheel).

Microprocessor 225 generates the main power switch control signal in response to the operator input signal received from operator interface 250. Microprocessor 225 may be any appropriately programmed microprocessor. An example of a suitable microprocessor is HCS12X available from FreeScale. This microprocessor may generate a pulse-width-modulated signal that may be used as the main power switch control signal.

Power interface 230 may be any off the shelf power interface. Suitable power interfaces include Mosfet IRFP 4710 and Mosfet driver IR 2110 both from International Rectifier.

The automatic traction control for drive system 200 may further include: a first low power switch 241 coupled between a positive terminal of battery 251 and a first terminal of first field component 217a, and having a gate coupled to power interface 230; a second low power switch 242 coupled between a negative terminal of battery 252 and the first terminal of first field component 217a, and having a gate coupled to power interface 230; a third low power switch 243 coupled between the positive terminal of battery 251 and a second terminal of first field component 217a, and having a gate coupled to power interface 230; and a fourth low power switch 244 coupled between the negative terminal of battery 252 and the second terminal of first field component 217a, and having a gate coupled to power interface 230. A first terminal of second field component 217b may be coupled to the second terminal of first field component 217a. In addition, the automatic traction control for drive system 200 may include: a fifth low power switch 245 coupled between the positive terminal of battery 251 and a first terminal of second field component 217b, and having a gate coupled to power interface 230; and a sixth low power switch 246 coupled between the negative terminal of battery 252 and the first terminal of second field component 217b, and having a gate coupled to power interface 230. Switches 241, 242, 243, 244, 245, and 246 are low power switches that control first and second field components 217a and 217b of each separately excited motor.

Although the embodiment described above utilizes switches 237a and 237b to short circuit armatures 215a and 215b, the switches may be used to provide proportional power to the two motors.

The economics of the present invention, a single electronic control unit to bring about an automatic traction control, are compelling. The present invention enables one electronic control to be used, rather than two. A single electronic control eliminates the potentiometer device used in the prior art which communicates between two electronic controllers. Also, a single electronic control uses only three electronic power switches, rather than four which are required in a two electronic control unit system. In addition, all the redundancies inherent in using two electronic control units, rather than one are eliminated.

The above description is considered that of the preferred embodiments only. Modifications of the invention will occur to those skilled in the art and to those who make or use the invention. Therefore, it is understood that the embodiments shown in the drawings and described above are merely for illustrative purposes and are intended to be included within, but not intended to limit the scope of the invention, which is defined by the following claims as interpreted according to the principles of patent law, including the doctrine of equivalents.

What is claimed is:

1. An automatic traction control system for a vehicle driven by first and second serially connected electric motors that are powered by batteries, said system comprising:
   an operator interface for generating an operator input signal representing a desired acceleration for the vehicle as applied to an accelerator pedal of the vehicle;
   a main electronic power switch coupled between the second electric motor and a negative terminal of the batteries for selectively varying current flowing through the first and second serially connected electric motors in response to a main power switch control signal;
   a first electronic power switch coupled across an armature of the first electric motor for selectively diverting current from the armature of the first electric motor in response to a first power switch control signal;
   a second electronic power switch coupled across an armature of the second electric motor for selectively diverting current from the armature of the second electric motor in response to a second power switch control signal;
   a first voltage monitor terminal coupled between the armatures of the first and second electric motors;
   a second voltage monitor terminal coupled between the armature of the second electric motor and the main electronic power switch; and
   a microprocessor coupled to said operator interface for receiving the operator input signal, said microprocessor monitors the voltage across the armatures of the first and second electric motors, and generates the switch control signals as a function of the operator input signal, the voltage across the armature of the first electric motor, and the voltage across the armature of the second electric motor.

2. The automatic traction control system of claim 1 and further comprising a power interface coupled to said microprocessor, said main electronic power switch, said first electronic power switch, said second electronic power switch, said first voltage monitor terminal, and said second voltage monitor terminal.

3. The automatic traction control system of claim 1 and further comprising:
   a first current monitor for monitoring the current passing through the armature of the first electric motor; and
   a second current monitor for monitoring the current passing through the armature of the second electric motor,
   wherein said microprocessor monitors the current flowing through each of the armatures of the first and second electric motors, and generates the switch control signals as a function of said operator input signal, the current flowing through the armature of the first electric motor, the current flowing through the armature of the second electric motor, the voltage across the armature of the first electric motor, and the voltage across the armature of the second electric motor.

4. The automatic traction control system of claim 3 and further comprising a power interface coupled to said microprocessor, said main electronic power switch, said first electronic power switch, said second electronic power switch, said first current monitor, said second current monitor, said first voltage monitor terminal, and said second voltage monitor terminal.

5. The automatic traction control system of claim 3, wherein said microprocessor generates the first power switch control signal to divert current from the armature of the first electric motor when the voltage monitored across the armature of the second electric motor exceeds the voltage monitored across the armature of the first electric motor by more than a predetermined voltage threshold and the current monitored by said first and second current monitors is lower than a predetermined current threshold.

6. The automatic traction control system of claim 5, wherein said microprocessor generates the second power switch control signal to divert current from the armature of the second electric motor when the voltage monitored across the armature of the first electric motor exceeds the voltage monitored across the armature of the second electric motor by more than the predetermined voltage threshold and the current monitored by said first and second current monitors is lower than the predetermined current threshold.

7. The automatic traction control system of claim 1, wherein said microprocessor generates the first power switch control signal to divert current from the armature of the first electric motor when the voltage monitored across the armature of the second electric motor exceeds the voltage monitored across the armature of the first electric motor by more than a predetermined voltage threshold.

8. The automatic traction control system of claim 7, wherein said microprocessor generates the second power switch control signal to divert current from the armature of the second electric motor when the voltage monitored across the armature of the first electric motor exceeds the voltage monitored across the armature of the second electric motor by more than the predetermined voltage threshold and the current monitored by said first and second current monitors is lower than the predetermined current threshold.

9. The automatic traction control system of claim 1, wherein said microprocessor generates the main power switch control signal in response to the operator input signal.

10. The automatic traction control system of claim 9, wherein the main power switch control signal is a pulse-width-modulated signal.

11. The automatic traction control system of claim 1 and further comprising:
    a first field component having a first terminal and a second terminal;
    a first low power switch coupled between a positive terminal of the batteries and said first terminal of said first field component, and having a gate coupled to said power interface;
    a second low power switch coupled between a negative terminal of the batteries and said first terminal of said first field component, and having a gate coupled to said power interface;
    a third low power switch coupled between the positive terminal of the batteries and said second terminal of said first field component, and having a gate coupled to said power interface; and
    a fourth low power switch coupled between the negative terminal of the batteries and said second terminal of said first field component, and having a gate coupled to said power interface.

12. The automatic traction control system of claim 11 and further comprising:
- a second field component having a first terminal and a second terminal, the first terminal of said second field component being coupled to the second terminal of said first field component;
- a fifth low power switch coupled between the positive terminal of the batteries and said first terminal of said second field component, and having a gate coupled to said power interface; and
- a sixth low power switch coupled between the negative terminal of the batteries and said first terminal of said second field component, and having a gate coupled to said power interface.

13. A drive system for an electric vehicle comprising:
an accelerator pedal;
batteries having a positive terminal and a negative terminal;
a first electric motor having an armature and a first field component;
a second electric motor having an armature and a second field component, said armatures of said first and second electric motors being serially connected between said positive and negative terminal of said batteries;
an operator interface for generating an operator input signal representing a desired acceleration for the vehicle as applied to said accelerator pedal;
a main electronic power switch coupled between said second electric motor and said negative terminal of said batteries for selectively varying current flowing through said armatures of said first and second electric motors in response to a main power switch control signal;
a first electronic power switch coupled across said armature of said first electric motor for selectively diverting current from said armature of said first electric motor in response to a first power switch control signal;
a second electronic power switch coupled across said armature of said second electric motor for selectively diverting current from said armature of said second electric motor in response to a second power switch control signal;
a first current monitor for monitoring the current passing through said armature of said first electric motor;
a second current monitor for monitoring the current passing through said armature of said second electric motor;
a first voltage monitor terminal coupled between said armatures of said first and second electric motors;
a second voltage monitor terminal coupled between said armature of said second electric motor and said main electronic power switch;
a power interface coupled to said main electronic power switch, said first electronic power switch, said second electronic power switch, said first current monitor, said second current monitor, said first voltage monitor terminal, and said second voltage monitor terminal; and
a microprocessor coupled to said operator interface for receiving the operator input signal, and coupled to said power interface for monitoring the current flowing through each of said armatures of said first and second electric motors, the voltage across said armatures of said first and second electric motors, and for generating the switch control signals as a function of the operator input signal, the current flowing through said armature of said first electric motor, the current flowing through said armature of said second electric motor, the voltage across said armature of said first electric motor, and the voltage across said armature of said second electric motor.

14. The drive system of claim 13 and further comprising:
- a first low power switch coupled between a positive terminal of said batteries and a first terminal of said first field component, and having a gate coupled to said power interface;
- a second low power switch coupled between a negative terminal of said batteries and the first terminal of said first field component, and having a gate coupled to said power interface;
- a third low power switch coupled between the positive terminal of said batteries and a second terminal of said first field component, and having a gate coupled to said power interface; and
- a fourth low power switch coupled between the negative terminal of said batteries and the second terminal of said first field component, and having a gate coupled to said power interface.

15. The drive system of claim 14 and further comprising:
- a fifth low power switch coupled between the positive terminal of said batteries and the first terminal of said second field component, and having a gate coupled to said power interface; and
- a sixth low power switch coupled between the negative terminal of said batteries and the first terminal of said second field component, and having a gate coupled to said power interface,
wherein the first terminal of said second field component is coupled to the second terminal of said first field component.

16. The drive system of claim 13, wherein said microprocessor generates the first power switch control signal to divert current from the armature of the first electric motor when the voltage monitored across the armature of the second electric motor exceeds the voltage monitored across the armature of the first electric motor by more than a predetermined voltage threshold.

17. The drive system of claim 16, wherein said microprocessor generates the second power switch control signal to divert current from the armature of the second electric motor when the voltage monitored across the armature of the first electric motor exceeds the voltage monitored across the armature of the second electric motor by more than the predetermined voltage threshold and the current monitored by said first and second current monitors is lower than the predetermined current threshold.

18. An automatic traction control system for a vehicle driven by first and second serially connected electric motors that are powered by batteries, said system comprising:
an operator interface for generating an operator input signal representing a desired acceleration for the vehicle as applied to an accelerator pedal of the vehicle;
a main electronic power switch coupled between the second electric motor and a negative terminal of the batteries for selectively varying current flowing through the first and second serially connected electric motors in response to a main power switch control signal;
a first electronic power switch coupled across an armature of the first electric motor for selectively diverting current from the armature of the first electric motor in response to a first power switch control signal;
a second electronic power switch coupled across an armature of the second electric motor for selectively diverting current from the armature of the second electric motor in response to a second power switch control signal;

a first current monitor for monitoring the current passing through the armature of the first electric motor;

a second current monitor for monitoring the current passing through the armature of the second electric motor; and a microprocessor coupled to said operator interface for receiving the operator input signal, said microprocessor monitors the current flowing through each of the armatures of the first and second electric motors, and generates the switch control signals as a function of the operator input signal, the current flowing through the armature of the first electric motor, and the current flowing through the armature of the second electric motor.

19. The automatic traction control system of claim 18 and further comprising a power interface coupled to said main electronic power switch, said first electronic power switch, said second electronic power switch, said first current monitor, and said second current monitor.

20. The automatic traction control system of claim 18 and further comprising:

a first field component having a first terminal and a second terminal;

a first low power switch coupled between a positive terminal of the batteries and said first terminal of said first field component;

a second low power switch coupled between a negative terminal of the batteries and said first terminal of said first field component;

a third low power switch coupled between the positive terminal of the batteries and said second terminal of said first field component; and a fourth low power switch coupled between the negative terminal of the batteries and said second terminal of said first field component.

21. The automatic fraction control system of claim 20 and further comprising:

a second field component having a first terminal and a second terminal, the first terminal of said second field component being coupled to the second terminal of said first field component;

a fifth low power switch coupled between the positive terminal of the batteries and said first terminal of said second field component; and a sixth low power switch coupled between the negative terminal of the batteries and said first terminal of said second field component, and having a gate coupled to said power interface.

* * * * *

UNITED STATES PATENT AND TRADEMARK OFFICE
CERTIFICATE OF CORRECTION

| | | |
|---|---|---|
| PATENT NO. | : 7,956,558 B2 | Page 1 of 1 |
| APPLICATION NO. | : 12/327002 | |
| DATED | : June 7, 2011 | |
| INVENTOR(S) | : Ian Dirk Cull et al. | |

It is certified that error appears in the above-identified patent and that said Letters Patent is hereby corrected as shown below:

Column 2, line 46, "use ea single" should be --use a single--.

Column 2, line 53, "fraction" should be --traction--.

Column 2, line 55, "fraction" should be --traction--.

Column 3, line 16, "fraction" should be --traction--.

Column 3, line 18, "fraction" should be --traction--.

Column 12, claim 21, line 10, "fraction" should be --traction--.

Signed and Sealed this
Eighteenth Day of October, 2011

David J. Kappos
*Director of the United States Patent and Trademark Office*